(12) United States Patent  
Rambler

(10) Patent No.: US 9,165,173 B2  
(45) Date of Patent: Oct. 20, 2015

(54) SECURITY METHOD USING AN IMAGING BARCODE READER

(71) Applicant: NCR Corporation, Duluth, GA (US)

(72) Inventor: Mark Rambler, Decatur, GA (US)

(73) Assignee: NCR Corporation, Duluth, GA (US)

( * ) Notice: Subject to any disclaimer, the term of this patent is extended or adjusted under 35 U.S.C. 154(b) by 20 days.

(21) Appl. No.: 13/904,637

(22) Filed: May 29, 2013

(65) Prior Publication Data

US 2014/0353382 A1 Dec. 4, 2014

(51) Int. Cl.
  *G06K 7/10* (2006.01)
(52) U.S. Cl.
  CPC .................................. *G06K 7/10821* (2013.01)
(58) Field of Classification Search
  CPC  G06K 17/00; G06K 7/10584; G06K 7/10821
  USPC ........ 235/462.01, 454, 462.13, 462.3, 462.31
  See application file for complete search history.

(56) References Cited

U.S. PATENT DOCUMENTS

| | | | | |
|---|---|---|---|---|
| 6,215,519 | B1 * | 4/2001 | Nayar et al. | 348/159 |
| 6,336,587 | B1 * | 1/2002 | He et al. | 235/462.45 |
| 6,726,094 | B1 * | 4/2004 | Rantze et al. | 235/379 |
| 7,293,711 | B2 * | 11/2007 | Brock | 235/462.01 |
| 7,780,081 | B1 * | 8/2010 | Liang | 235/383 |
| 2002/0170970 | A1 * | 11/2002 | Ehrhart | 235/462.41 |
| 2005/0189411 | A1 * | 9/2005 | Ostrowski et al. | 235/383 |
| 2005/0189412 | A1 * | 9/2005 | Hudnut et al. | 235/383 |
| 2006/0043193 | A1 * | 3/2006 | Brock | 235/462.41 |
| 2006/0104479 | A1 * | 5/2006 | Bonch-Osmolovskiy et al. | 382/103 |
| 2006/0154642 | A1 * | 7/2006 | Scannell, Jr. | 455/404.1 |
| 2006/0283943 | A1 * | 12/2006 | Ostrowski et al. | 235/383 |
| 2007/0182543 | A1 * | 8/2007 | Luo | 340/521 |
| 2009/0152348 | A1 * | 6/2009 | Ostrowski et al. | 235/383 |
| 2010/0118144 | A1 * | 5/2010 | Fawcett et al. | 348/143 |
| 2011/0261203 | A1 * | 10/2011 | Mupkala et al. | 348/150 |
| 2013/0018741 | A1 * | 1/2013 | Ostrowski et al. | 705/20 |

* cited by examiner

Primary Examiner — Paultep Savusdiphol  
(74) Attorney, Agent, or Firm — Paul W. Martin

(57) ABSTRACT

A security method using an imaging barcode reader which captures image data for security purposes. An example method includes receiving an unauthorized activity signal by the barcode reader, and capturing image data by a camera in the barcode reader in response to the unauthorized activity signal.

14 Claims, 3 Drawing Sheets

SECURITY METHOD USING AN IMAGING BARCODE READER

BACKGROUND

The present invention relates to barcode readers, and more specifically to a security method using an imaging barcode reader.

Barcode readers are well known for their usefulness in retail checkout and inventory control. For example, an imaging barcode reader typically includes a camera which captures an image of an item, including a barcode on the item. The imaging barcode reader decodes the barcode to obtain information identifying the item.

Retailers have concerns about security at checkout stations. It would be desirable to enable an imaging barcode reader to provide security functions, alone or in combination with other security equipment.

SUMMARY

In accordance with the teachings of the present invention, a security method using an imaging barcode reader is provided.

An example method of operating a barcode reader to provide security includes receiving an unauthorized activity signal by the barcode reader, and capturing image data by a camera in the barcode reader in response to the unauthorized activity signal.

An example method of operating a barcode reader in a checkout lane in order to provide security during a monitoring period includes receiving by the barcode reader a signal during the monitoring period indicative of unauthorized activity, capturing image data by a camera in the barcode reader in response to the signal, and sending by the barcode reader an alert to a security system in response to the capturing of the image data.

An example barcode reader includes a camera, and a processor configured to operate the camera during a first mode to capture first image data during a transaction including a barcode and during a second mode to capture second image data during unauthorized activity. The barcode reader may additionally include communication circuitry for sending the second image data to a security system, for sending alerts to a security system in response to the unauthorized activity, and/or for receiving a signal in response to the unauthorized activity wherein the processor begins capturing the second image data in response to the signal.

DETAILED DESCRIPTION

Figure 1:
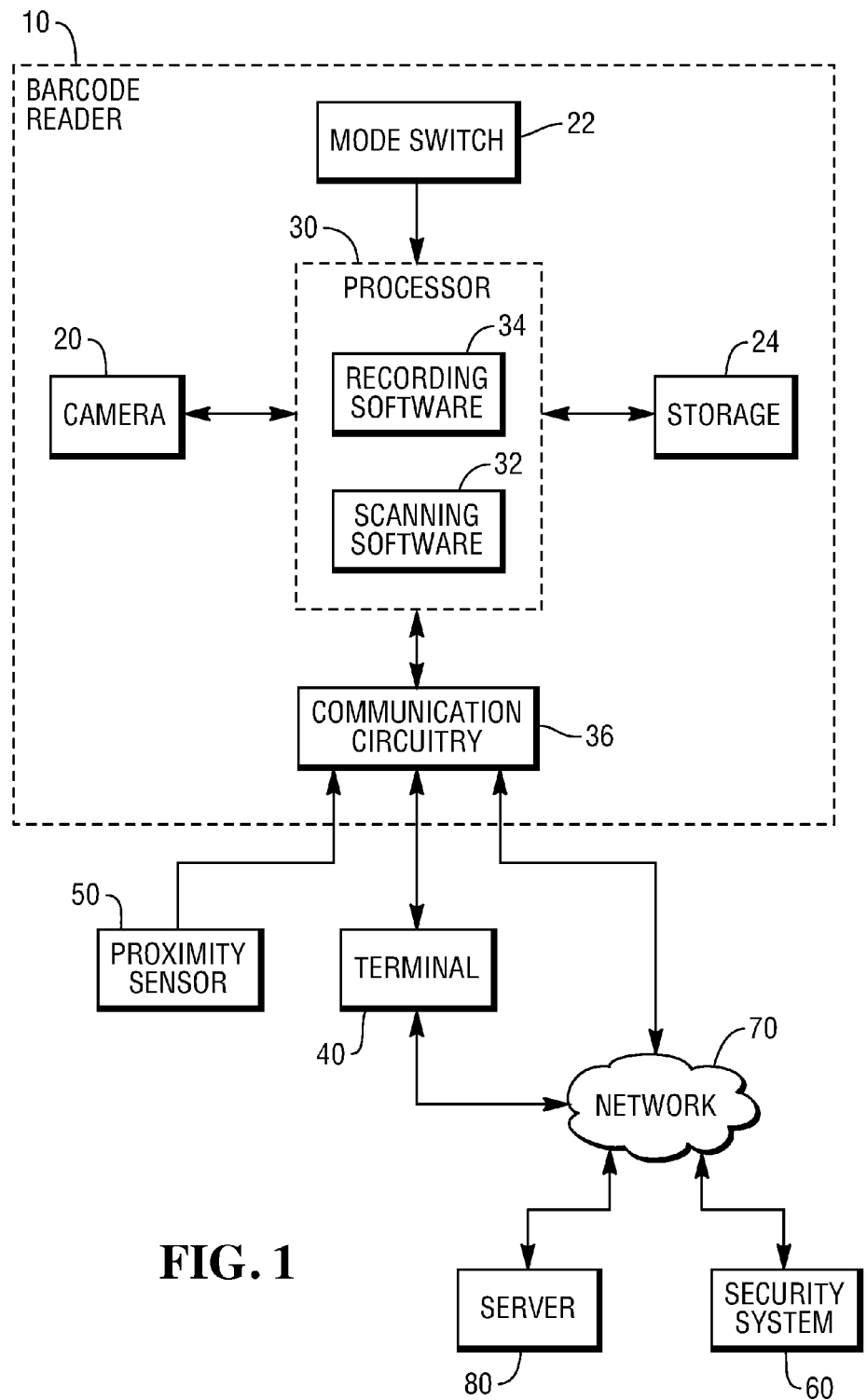
FIG. 1 is a block diagram of an example checkout system.

Turning now to FIG. 1, an example barcode reader 10 includes one or more processors 30, memory, program and data storage, and a built-in clock which is synchronized with a current time and date. Barcode reader 10 executes software/firmware and includes communication circuitry 36 for connecting to terminal 14, which may include any combination of Universal Serial Bus (USB) circuitry, Bluetooth standard circuitry, RS232 circuitry, and IBM485 circuitry. Communication circuitry 36 may additionally include network circuitry for connecting to network 70, via wire and/or wireless.

Barcode reader 10 further includes one or more cameras 20, which may include charge coupled device or other imaging devices. Barcode reader 10 may be coupled to terminal 40 and/or directly coupled to network 70.

Processor 30 executes scanning software 32, which controls cameras 20, obtains image data from cameras 20, processes the image data to locate barcodes, and decodes found barcodes on items during the transaction. Scanning software 32 sends decoded barcode data to terminal 40.

Processor 30 further executes recording software 34. Recording software 34 controls one or more of cameras 20, obtains image data from cameras 20, and stores the image data in storage 24, and may alternatively, or in addition, send captured image data to storage within terminal 40 or within a network location, such as at security system 60 or server 80. The image data may be in the form of still images and/or motion videos. The image data may be compressed by processor 30 or stored uncompressed.

Recording software 34 may be configured to record image data in a variety different ways. For example, recording software 34 may be configured to automatically record image data during a predetermined monitoring time period, such as a period during and/or after store hours, when authorized or unauthorized persons operate terminal 40. Thus, recording software 34 may capture evidence of theft or other unauthorized activity by employees at checkout lanes during store hours and theft or other unauthorized activity by employees and non-employees after store hours.

As another example, recording software 34 may be configured to begin recording upon receipt of a signal resulting from operation of terminal 40 and/or peripherals coupled to terminal 40, such as a signal resulting from a cash drawer being opened.

The specific terminal 40 that produces the signal may be any terminal 40 in the store, not just the terminal 40 that may share the same checkout lane as barcode reader 10. An incident at one checkout lane may trigger recording at other checkout lanes, which may capture image data of an unauthorized person as the unauthorized person moves to other monitored locations in the store. Thus, recording software 34 may be configured to begin recording upon receipt of a signal over the network resulting from operation of any of the networked terminals 40 and/or peripherals coupled to the networked terminals 40, such as a signal resulting from a cash drawer being opened at the networked terminal 40.

As yet another example, recording software 34 may be configured to begin recording in response to operator input, such as operation of a recording enable switch 22.

As yet another example, recording software 34 may be configured to begin recording in response to signals from armed proximity sensors 50 placed in or around the checkout environment. Example proximity sensors 50 may be sensors which sense movement of a person in proximity to sensors 50.

As yet another example, recording software 34 may be configured to begin recording in response to a remote input from security system 60.

Any of the above methods of configuring recording software 34 to record may be combined. For example, recording software 34 may be configured to begin recording only during a predetermined time period upon receipt of a signal resulting from operation of terminal 40 and/or peripherals coupled to terminal 40.

Terminal 14 executes computer software that may be stored in a computer readable medium. For example, terminal 40 executes transaction software for completing purchases of items. In the case of items with barcodes, the transaction software obtains decoded barcode data from scanning software 32 and obtains prices for the items from a price-look-up table or other item database, either located at terminal 40 or at a server 80 coupled to terminal 40 via a network 70.

Terminal 14 may locally store and execute other applications. In an alternative embodiment, terminal 40 may execute recording software 34 instead of barcode reader 10. A typical store may include a plurality of terminals 14 with associated barcode readers 10.

Terminal 14 includes one or more processors, memory, program and data storage, and a built-in clock which is synchronized with a current time and date. Terminal 14 may execute an operating system, such as a Microsoft or Linux operating system. Terminal 14 further includes network circuitry for connecting to network 70, via wire and/or wireless, and other circuitry for connecting to one or more peripherals, such as an input device and display (e.g., a touch overlay to the display). For example, terminal 14 may include any combination of USB circuitry, Bluetooth standard circuitry, RS232 circuitry, and IBM485 circuitry.

Network 70 may include any combination of local and wide area networks, and wired and wireless networks, and may include a global communications information network, also known as the Internet.

Security system 60 may remotely control recording software 34 and may store and analyze captured image data. Security personnel operating security system 60 may notify police.

Figure 2:
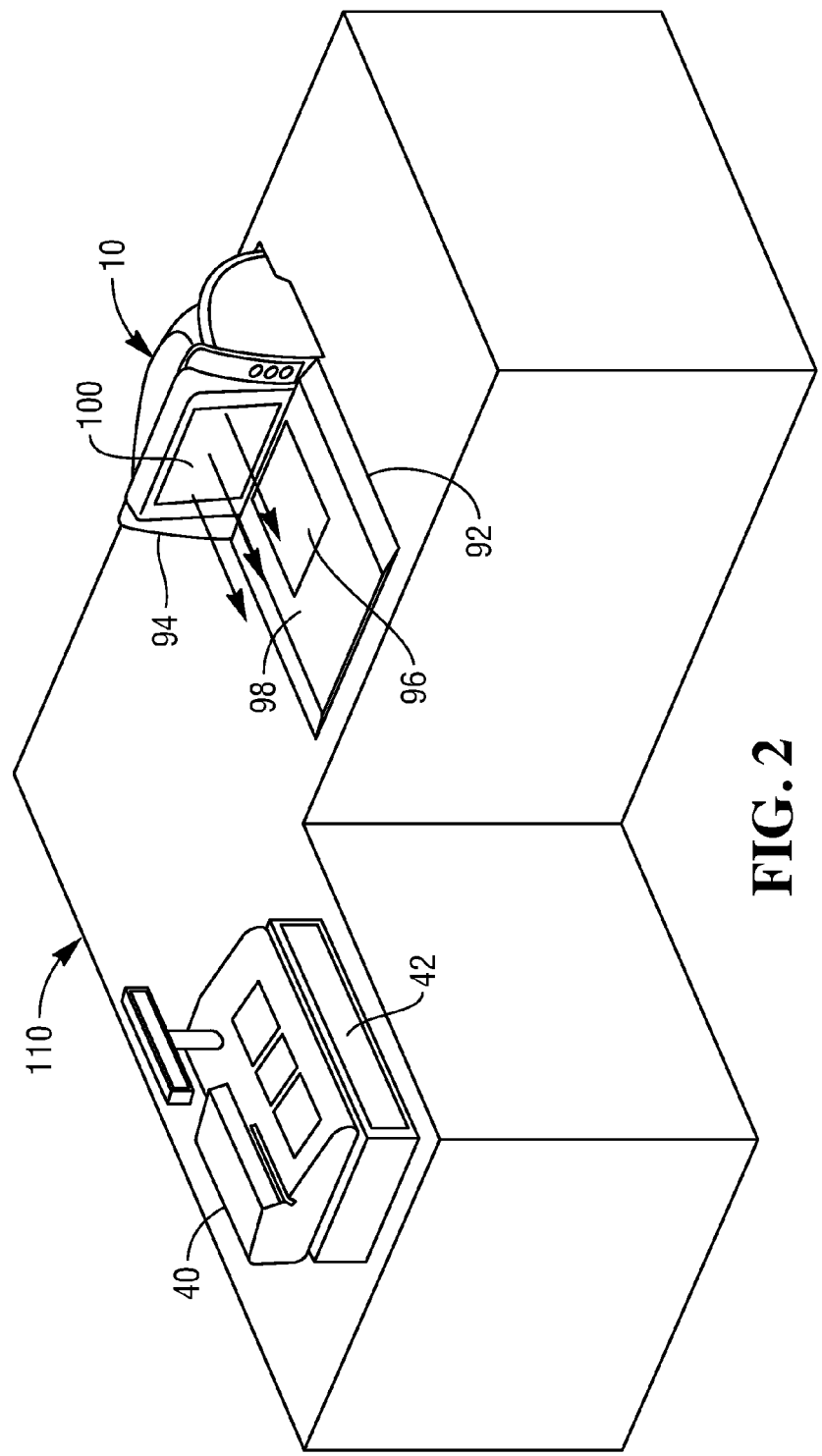
FIG. 2 is a perspective view of the example imaging barcode reader.

Turning now to FIG. 2, barcode reader 10 and terminal 40 are located at an example checkout counter 110 in a grocery store or other retail establishment. Example checkout counter 110 includes a generally L-shaped portion with barcode reader 10 oriented in a direction approximately ninety degrees from the orientation of terminal 40. Other checkout counter configurations are also envisioned.

An example embodiment of barcode reader 10 includes a first housing portion 92 and a second housing portion 94. Barcode reader 10 may be capable of reading a barcode appearing on a plurality of sides, including one or more of a bottom, leading, trailing, assistant, or customer side of an item, or anywhere in-between.

First housing portion 92 includes a substantially horizontal aperture 96 with a corresponding window. Substantially horizontal aperture 96 may be flush or substantially flush with a top surface of checkout counter 110. In the example embodiment, aperture 96 is located within a scale weigh plate 98 associated with a scale in barcode reader 10.

Example barcode reader 10 may read barcodes through aperture 96 in one or more, or a combination of, different ways. For example, barcode reader 10 may capture images of barcodes through aperture 96 using a camera 20.

As another example, barcode reader 10 may include a laser and mirrors which direct scanning light beams through aperture 96. Scanning light beams reflected from items pass through aperture 96 and are directed by the mirrors to a photodetector which converts the reflected light to electrical signals based upon the intensity of the reflected light.

Second housing portion 94 extends vertically above the top surface of checkout counter 110. Second housing portion 94 includes a substantially vertical aperture 100 with a corresponding window.

Example barcode reader 10 may read barcodes through aperture 100 in one or more, or a combination of, different ways. For example, barcode reader 10 may capture images of barcodes through aperture 100 using a camera 20.

As another example, barcode reader 10 may include a laser and mirrors which direct scanning light beams through aperture 100. Scanning light beams reflected from items pass through aperture 100 and are directed by the mirrors to a photodetector which converts the reflected light to electrical signals based upon the intensity of the reflected light.

In one example configuration, barcode reader 10 uses one or more lasers and mirrors to read barcodes through substantially horizontal aperture 96 and one or more cameras 20 to read barcodes through substantially vertical aperture 100.

In another example configuration, barcode reader 10 uses one or more cameras 20 to read barcodes through substantially horizontal aperture 96 and one or more cameras 20 to read barcodes through substantially vertical aperture 100.

The one or more cameras 20 that read barcodes through substantially vertical aperture 100 under control of scanning software 32 also serve a security function by capturing image data under control of recording software 34. In the example checkout counter configuration of FIG. 2, terminal 40 is positioned within the field of view of camera 20, which may include all or part of terminal 40, including cash drawer 42, and surrounding areas of checkout counter 110.

Figure 3:
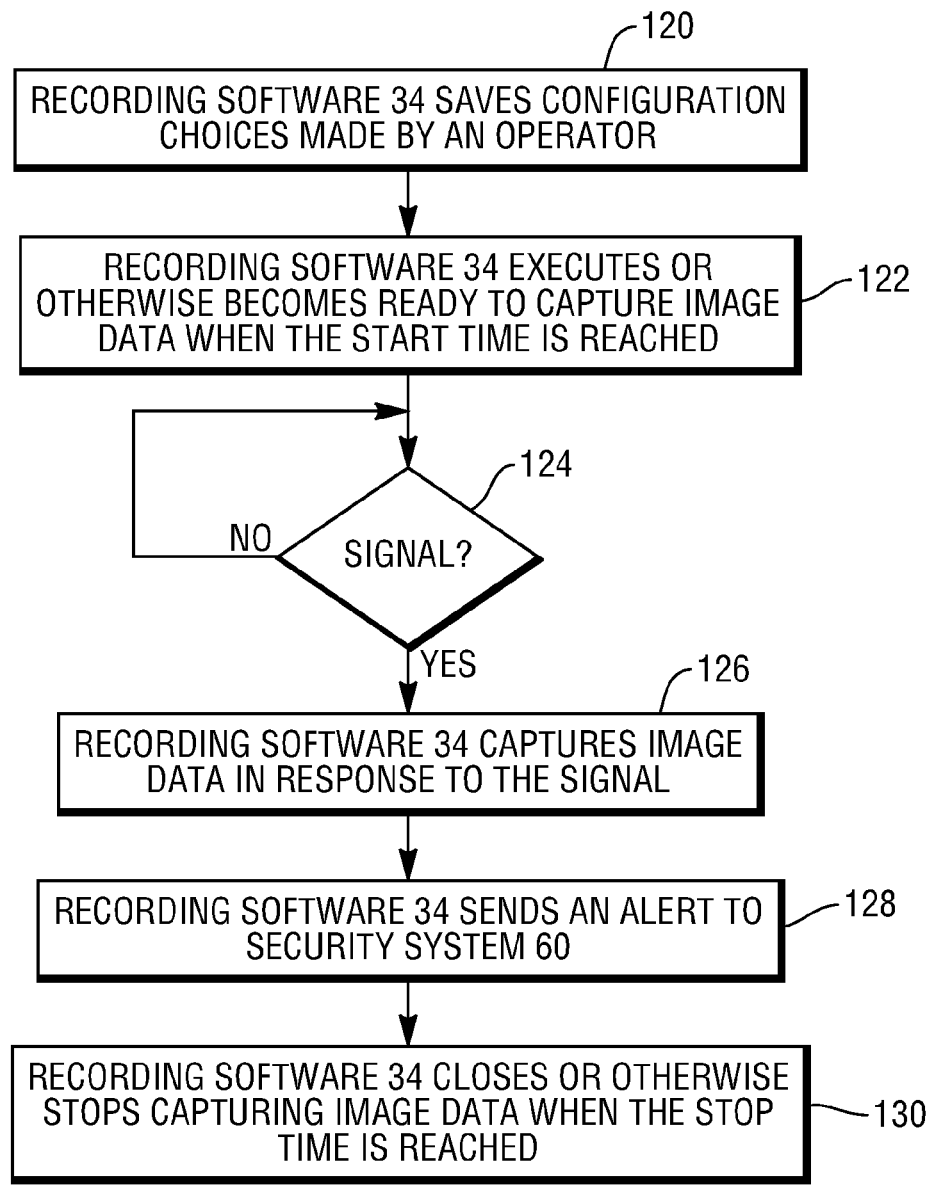
FIG. 3 is a flow diagram illustrating an example security method using an imaging barcode reader.

Turning now to FIG. 3, an example security method is illustrated.

In step 120, recording software 34 saves configuration choices made by an operator. In this example method, recording software 34 is configured to automatically begin recording image data from a camera 20 in second housing portion 94 between a start time and a stop time, such as after store hours, upon receipt of a signal resulting from operation of terminal 40 and/or peripherals coupled to terminal 40, such as a signal resulting from cash drawer 42 being opened.

In step 122, recording software 34 executes or otherwise becomes ready to capture image data when the start time is reached.

In step 124, recording software 34 waits for a signal from terminal 40 and/or one of its peripherals. When recording software 34 receives a signal, operation proceeds to step 126.

In step 126, recording software 34 captures image data in response to receipt of the signal. Recording software 34 may continue to capture the image data for as long as recording software 34 continues to receive the signal. Alternatively, recording software 34 may capture image data for a predetermined time period from initial receipt of the signal. Recording software 34 stores the image data in storage 24.

In step 128, recording software 34 sends an alert to security system 60. Recording software 34 may also send the captured image data to security system 60. Security personnel operating security system 60 may notify police.

In step 130, recording software 34 closes or otherwise stops capturing image data when the stop time is reached.

Advantageously, the security method allows grocery and other stores to monitor the area around terminal 40 for theft or other illegal activity.

Although the present invention has been described with particular reference to certain preferred embodiments thereof, variations and modifications of the present invention can be effected within the spirit and scope of the following claims.

What is claimed is:

1. A method of operating a barcode reader to provide security comprising:

receiving an unauthorized activity signal by the barcode reader, wherein receiving further includes receiving the unauthorized activity signal from a terminal coupled to the barcode reader when a cash drawer is opened at the terminal during operation of the terminal and automatically receiving the unauthorized activity signal from the terminal in response to the cash drawer being opened; and capturing image data by a camera in the barcode reader in response to the unauthorized activity signal.

2. The method of claim 1, wherein the capturing step comprises:

capturing the image data by the camera only during a predetermined monitoring period.

3. The method of claim 1, further comprising:

storing the image data at the terminal coupled to the barcode reader.

4. The method of claim 1, further comprising:

storing the image data at a network storage location.

5. The method of claim 1, further comprising:

sending an alert to a security system in response to the capturing of the image data.

6. A method of operating a barcode reader in a checkout lane in order to provide security during a monitoring period comprising:

receiving by the barcode reader a signal during the monitoring period indicative of unauthorized activity, wherein the signal originates from a device that is coupled to the barcode reader and the signal is automatically received by the barcode reader from the device;

capturing image data by a camera in the barcode reader in response to the signal;

providing final over a network to one or more additional barcode readers, each additional barcode reader in a different checkout lane, and capturing additional image data by one or more other cameras integrated into the one or more other barcode in response to the signal; and sending by the barcode reader an alert to a security system in response to the capturing of the image data.

7. The method of claim 6, wherein the monitoring period is during store hours.

8. The method of claim 6, wherein the monitoring period is after store hours.

9. A barcode reader comprising:

a camera; and a processor configured to operate the camera during a first mode to capture first image data during a transaction including a barcode and during a second mode to capture second image data during unauthorized activity, and wherein during the second mode the second image is captured based on the camera automatically receiving a signal from a device that is coupled to the camera, and wherein the processor further configured to notify other barcode readers networked together to capture additional images when the barcode reader is in the first mode or the second mode.

10. The barcode reader of claim 9, further comprising:

communication circuitry for sending the second image data to a security system.

11. The barcode reader of claim 9, further comprising:

communication circuitry for sending alerts to a security system in response to the unauthorized activity.

12. The barcode reader of claim 9, further comprising:

communication circuitry for receiving the signal in response to the unauthorized activity;

wherein the processor begins capturing the second image data in response to the signal.

13. The barcode reader of claim 9, wherein the signal is from a sensor.

14. The barcode reader of claim 9, wherein the signal is from a terminal coupled to the barcode reader.

* * * * *